(12) United States Patent
Adachi et al.

(10) Patent No.: US 7,916,959 B2
(45) Date of Patent: Mar. 29, 2011

(54) IMAGE ENCODING METHOD, IMAGE DECODING METHOD, IMAGE ENCODING APPARATUS, IMAGE DECODING APPARATUS, IMAGE ENCODING PROGRAM, AND IMAGE DECODING PROGRAM

(75) Inventors: Satoru Adachi, Yokohama (JP); Minoru Etoh, Yokohama (JP); Sadaatsu Kato, Yokosuka (JP); Thiow Keng Tan, Jalan Sindor (SG)

(73) Assignee: NTT DoCoMo, Inc., Tokyo (JP)

(*) Notice: Subject to any disclaimer, the term of this patent is extended or adjusted under 35 U.S.C. 154(b) by 1054 days.

(21) Appl. No.: 10/680,205

(22) Filed: Oct. 8, 2003

(65) Prior Publication Data
US 2004/0126028 A1 Jul. 1, 2004

(30) Foreign Application Priority Data
Oct. 8, 2002 (JP) .................. P2002-295429

(51) Int. Cl.
*G06K 9/36* (2006.01)
(52) U.S. Cl. ......... 382/239; 382/233; 382/246; 382/250
(58) Field of Classification Search .......... 382/166, 382/232–244, 246, 250, 298, 299
See application file for complete search history.

(56) References Cited

U.S. PATENT DOCUMENTS

| | | | |
|---|---|---|---|
| 4,920,426 A | | 4/1990 | Hatori et al. |
| 5,021,891 A | * | 6/1991 | Lee ................ 382/250 |
| 5,091,782 A | * | 2/1992 | Krause et al. ........ 348/400.1 |
| 5,107,345 A | * | 4/1992 | Lee ................ 382/250 |
| 5,121,216 A | | 6/1992 | Chen et al. |
| 5,333,212 A | | 7/1994 | Ligtenberg |
| 5,357,584 A | * | 10/1994 | Yamaoka .......... 382/251 |
| 5,454,051 A | * | 9/1995 | Smith ............ 382/233 |
| 5,553,164 A | | 9/1996 | Itagaki |
| 5,631,744 A | | 5/1997 | Takeuchi et al. |
| 5,724,097 A | * | 3/1998 | Hibi et al. ......... 375/240.04 |
| 5,724,453 A | * | 3/1998 | Ratnakar et al. ...... 382/251 |

(Continued)

FOREIGN PATENT DOCUMENTS
EP 562420 A2 9/1993
(Continued)

OTHER PUBLICATIONS

IEEE Adaptive Block-Size transform coding for Image compression 0-8186-7919-0/97.*

(Continued)

*Primary Examiner* — Samir A Ahmed
*Assistant Examiner* — Jayesh A Patel
(74) *Attorney, Agent, or Firm* — Brinks Hofer Gilson & Lione

(57) ABSTRACT

An image decoding method, apparatus and program for decoding coded picture data is disclosed. In the method, apparatus and program, the coded picture data is entropy-decoded to derive four transform coefficient strings each comprising entropy-decoded sixteen (16) transform coefficients. The four transform coefficient strings are combined into an 8x8 block of entropy-decoded sixty four (64) transform coefficients by de-interleaving the four strings in such a manner as to select a lower frequency transform coefficient alternately from the four strings and arrange it in the 8x8 block in an order of a low frequency to a high frequency. An inverse orthogonal transform is then performed on the 8x8 block of the entropy-decoded sixty four (64) transform coefficients.

6 Claims, 7 Drawing Sheets

U.S. PATENT DOCUMENTS

| | | | |
|---|---|---|---|
| 5,740,283 | A | 4/1998 | Meeker |
| 5,832,128 | A | 11/1998 | Suzuki |
| 6,185,312 | B1 | 2/2001 | Nakamura et al. |
| 6,529,634 | B1* | 3/2003 | Thyagarajan et al. ........ 382/239 |
| 6,646,578 | B1 | 11/2003 | Au |
| 6,795,584 | B2* | 9/2004 | Karczewicz et al. ......... 382/239 |
| 6,839,468 | B1* | 1/2005 | Mitchell et al. ............... 382/250 |
| 6,975,584 | B1 | 12/2005 | Schlegel et al. |
| 2002/0157005 | A1 | 10/2002 | Brunk et al. |
| 2003/0097621 | A1* | 5/2003 | Xin ................................ 714/701 |
| 2003/0161397 | A1* | 8/2003 | Watson et al. ............. 375/240.2 |
| 2003/0190085 | A1* | 10/2003 | Lin et al. ........................ 382/250 |
| 2004/0066974 | A1* | 4/2004 | Karczewicz et al. ......... 382/239 |
| 2007/0154105 | A1 | 7/2007 | Adachi et al. |
| 2009/0028450 | A1 | 1/2009 | Adachi et al. |

FOREIGN PATENT DOCUMENTS

WO    WO 2004/032032 A1    4/2004

OTHER PUBLICATIONS

Mathias Wien, Integer transform for H.26L using adaptive block transforms, Aug. 2000, ITU, Study group 16,1-5.*

Hybrid video coding—Block transform, Mathias et al., SPIE vol. 4671, 0277-786X, 2002, pp. 1040-1051.*

Mathias Wien, et al., "Integer Transforms for H.26L using Adaptive Block Transforms", ITU-Telecommunications Standardization Sector, Study Group 16, File name: Q15-K-24, Aug. 22-25, 2000, pp. 1-5.

Mathias Wien et al., "16 bit Adaptive Block size Transforms", Joint Video Team (JVT) of ISO/IEC MPEG & ITU-T VCEG (ISO/IEC JTC1/SC29/WG11 and ITU-T SG.16 Q.6), XP-002339407, May 6-10, 2002, pp. 1-12.

Mathias Wien, et al., "Simplified Adaptive Block Transforms", ITU-Telecommunications Standardization Sector-Study Group 16 Question 6-Video Coding Experts Group (VCEG), XP-002339410, Dec. 4-6, 2001, pp. 1-5.

Mathias Wien et al., "Hybrid video coding using variable size block transforms", Visual Communications and Image Processing 2002—Proceedings of the SPIE—The International Society for Optical Engineering, vol. 4671, XP-008050719, Jan. 21-23, 2002, pp. 1040-1051.

S. Adachi, et al., "CAVLC Cleanup to Accommodate ABT including Field Scans", Joint Video Team (JVT) of ISO/IEC MPEG & ITU-T VCEG (ISO/IEC JTC1/SC29/WG11 and ITU-T SG.16 Q.6), Oct. 9-17, 2002, XP-002339408, pp. 1-4.

Fumitaka Ono, et al., "Basic Technologies on International Image Coding Standards" Corona Publishing Co., Ltd., Mar. 20, 1998, pp. 80-84 (with full English Translation).

Fumitaka Ono, et al., "Basic Technology of International Standard Image Coding" Corona Publishing Co., Ltd., Advanced Imaging Technology Series 1, Mar. 20, 1998, pp. 236-264 (with full English Translation).

Office Action from the USPTO, U.S. Appl. No. 11/712,010, mailing date Jan. 10, 2008.

Office Action issued Feb. 28, 2005 in Japanese patent application No. 2002-295429 (with translation).

Search Report issued Aug. 18, 2005 in European patent application No. 03022877.9.

Office Action for Co-pending U.S. Appl. No. 11/712,010, dated Apr. 16, 2009, 13 pages.

Office Action in co-pending U.S. Appl. No. 12/191,563 dated May 26, 2009, 10 pages.

European Search Report for European Application No. 06012528.3, dated Aug. 21, 2009, 11 pages.

Lillevold, K. et al., "CAVLC for ABT", Joint Video Team (JVT) of ISO/IEC MPEG & ITU-T VCEG (ISO/IEC JTC1/SC29/WG11 and ITU-T SG16 Q6), No. JVT-E085, Oct. 4, 2002, XP030005501, Geneva, Switzerland, Oct. 9-17, 2002, 5 pages.

Sullivan, G. et al., "Preliminary Invitation to the Fifth JVT Meeting", The Joint Video Team (JVT) of the ITU-T Q.6/16 Video Coding Expterts Group (VCEG) and the ISO/IEC JTC1/SC29/VVG11 Moving Picture Experts Group (MPEG), File: Invitation_R1.doc, Sep. 9, 2002, pp. 1-4, XP002540392, Geneva, Switzerland, Oct. 9-17, 2002,.

Unknown, "JVT-E000r0.txt", The Joint Video Team (JVT) of the ITU-T, Q.6/16 Video Coding Experts Group (VCEG) and the ISO/IEC JTC1/SC29/WG11 Moving Picture Experts Group (MPEG), Document JVT-E000RO.TXT, Oct. 5, 2002, pp. 1-4, XP002540393, Geneva, Switzerland, Oct. 9-17, 2002.

Unknown, "Terms of Reference for Joint Video Team (JVT) Activities", Feb. 2002, pp. 1-15, XP002540404.

Office Action from co-pending U.S. Appl. No. 12/191,563, dated Nov. 30, 2009, 11 pages.

Office Action from co-pending U.S. Appl. No. 11/712,010, dated Aug. 6, 2008, 11 pages.

Notice of Allowance from co-pending U.S. Appl. No. 11/712,010, dated Mar. 22, 2010, 10 pages.

Office Action from co-pending U.S. Appl. No. 12/191,563, dated May 11, 2010, 13 pages.

* cited by examiner

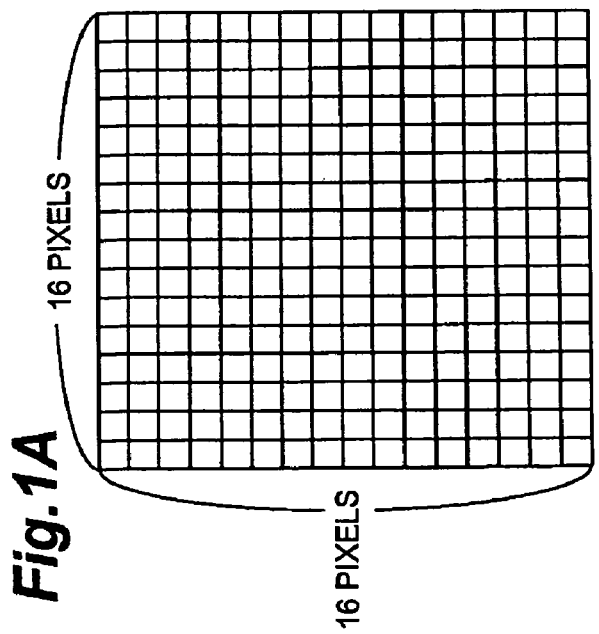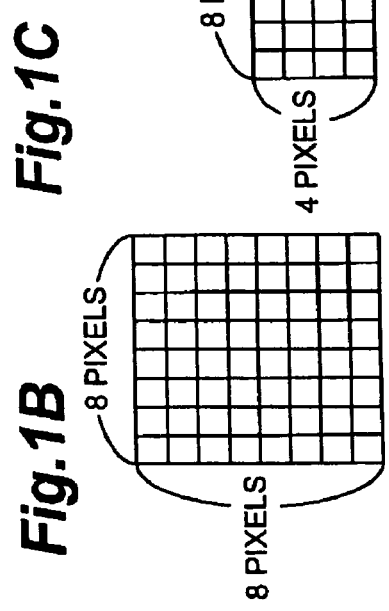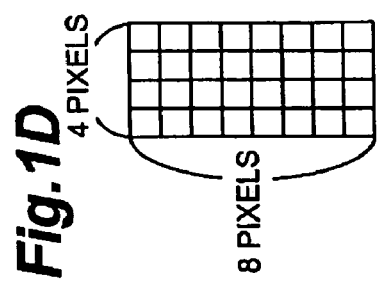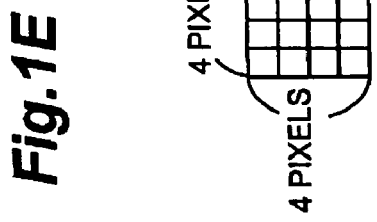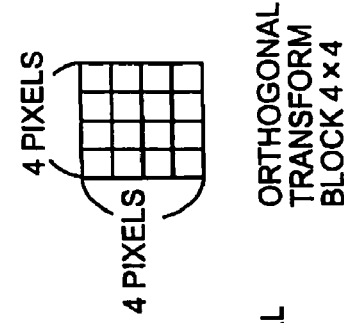

READOUT OF
ORTHOGONAL TRANSFORM COEFFICIENTS 0 1 2 3 ... 15

COEFFICIENT STRING AFTER READOUT

| NO. | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| COEFFICIENT VALUE | 16 | 0 | 0 | 8 | 4 | 0 | 1 | 0 | 2 | 1 | 0 | 0 | 1 | 0 | 0 | 0 |

EXAMPLE OF COEFFICIENT STRING AFTER READOUT

Fig.3

| RUN \ TABLE | 1 | 2 | 3 | 4 | 5 | 6 | >6 |
|---|---|---|---|---|---|---|---|
| 0 | 1 | 1 | 11 | 11 | 11 | 11 | 111 |
| 1 | 0 | 01 | 10 | 10 | 10 | 000 | 110 |
| 2 | - | 00 | 01 | 01 | 011 | 001 | 101 |
| 3 | - | - | 00 | 001 | 010 | 011 | 100 |
| 4 | - | - | - | 000 | 001 | 010 | 011 |
| 5 | - | - | - | - | 000 | 101 | 010 |
| 6 | - | - | - | - | - | 100 | 001 |
| 7 | - | - | - | - | - | - | 0001 |
| 8 | - | - | - | - | - | - | 00001 |
| 9 | - | - | - | - | - | - | 000001 |
| 10 | - | - | - | - | - | - | 0000001 |
| 11 | - | - | - | - | - | - | 00000001 |
| 12 | - | - | - | - | - | - | 000000001 |
| 13 | - | - | - | - | - | - | 0000000001 |
| 14 | - | - | - | - | - | - | 00000000001 |

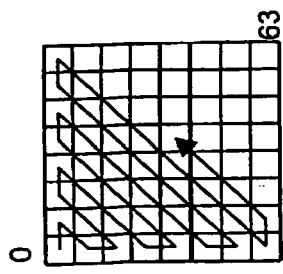
Fig.4A COEFFICIENT MATRIX BEFORE READOUT
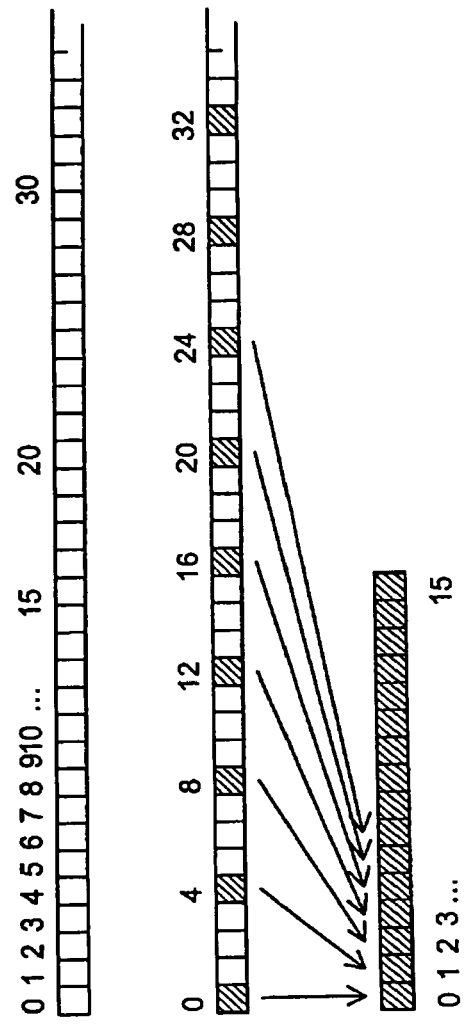
Fig.4B COEFFICIENT STRING AFTER READOUT
Fig.4C FIRST DIVIDED COEFFICIENT STRING
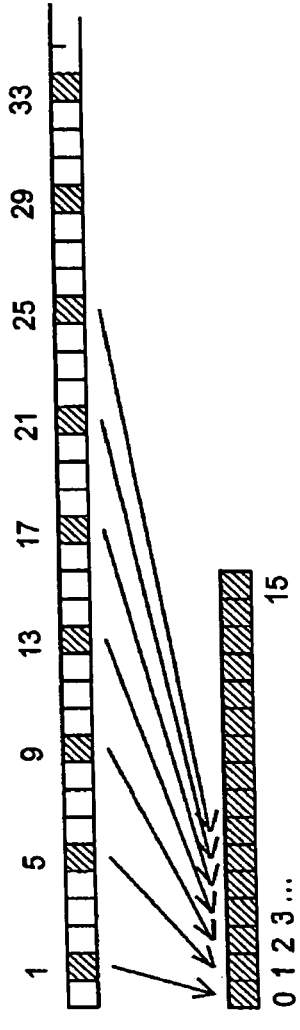
Fig.4D SECOND DIVIDED COEFFICIENT STRING

DEFINITION OF ARRANGEMENT OF
DIVIDED COEFFICIENT STRINGS IN 8 × 8 BLOCK

DEFINITION OF ARRANGEMENT OF
DIVIDED COEFFICIENT STRINGS IN 8 × 4 BLOCK

DEFINITION OF ARRANGEMENT OF
DIVIDED COEFFICIENT STRINGS IN 4 × 8 BLOCK

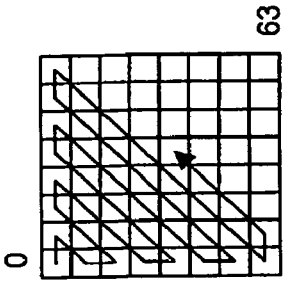
*Fig.6A* COEFFICIENT MATRIX BEFORE READOUT
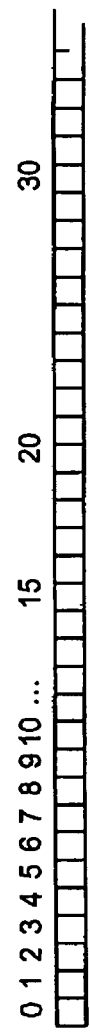
*Fig.6B* COEFFICIENT STRING AFTER READOUT
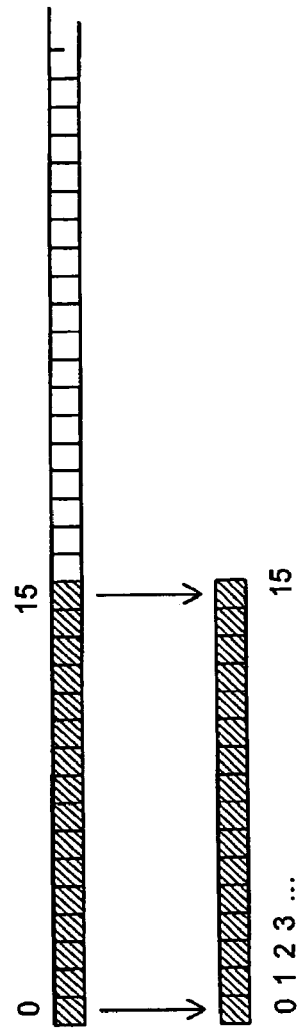
*Fig.6C* FIRST DIVIDED COEFFICIENT STRING
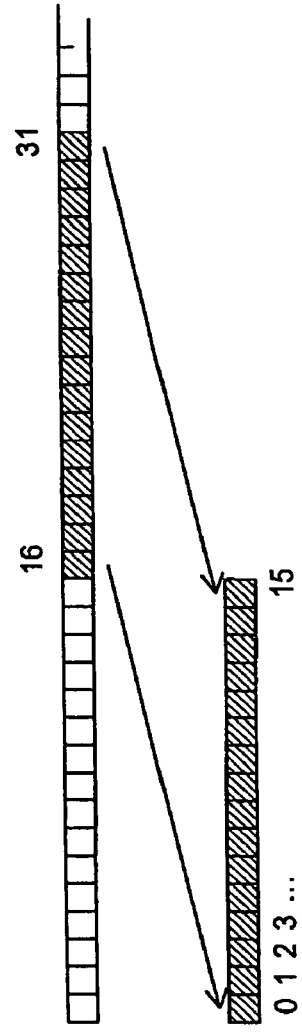
*Fig.6D* SECOND DIVIDED COEFFICIENT STRING

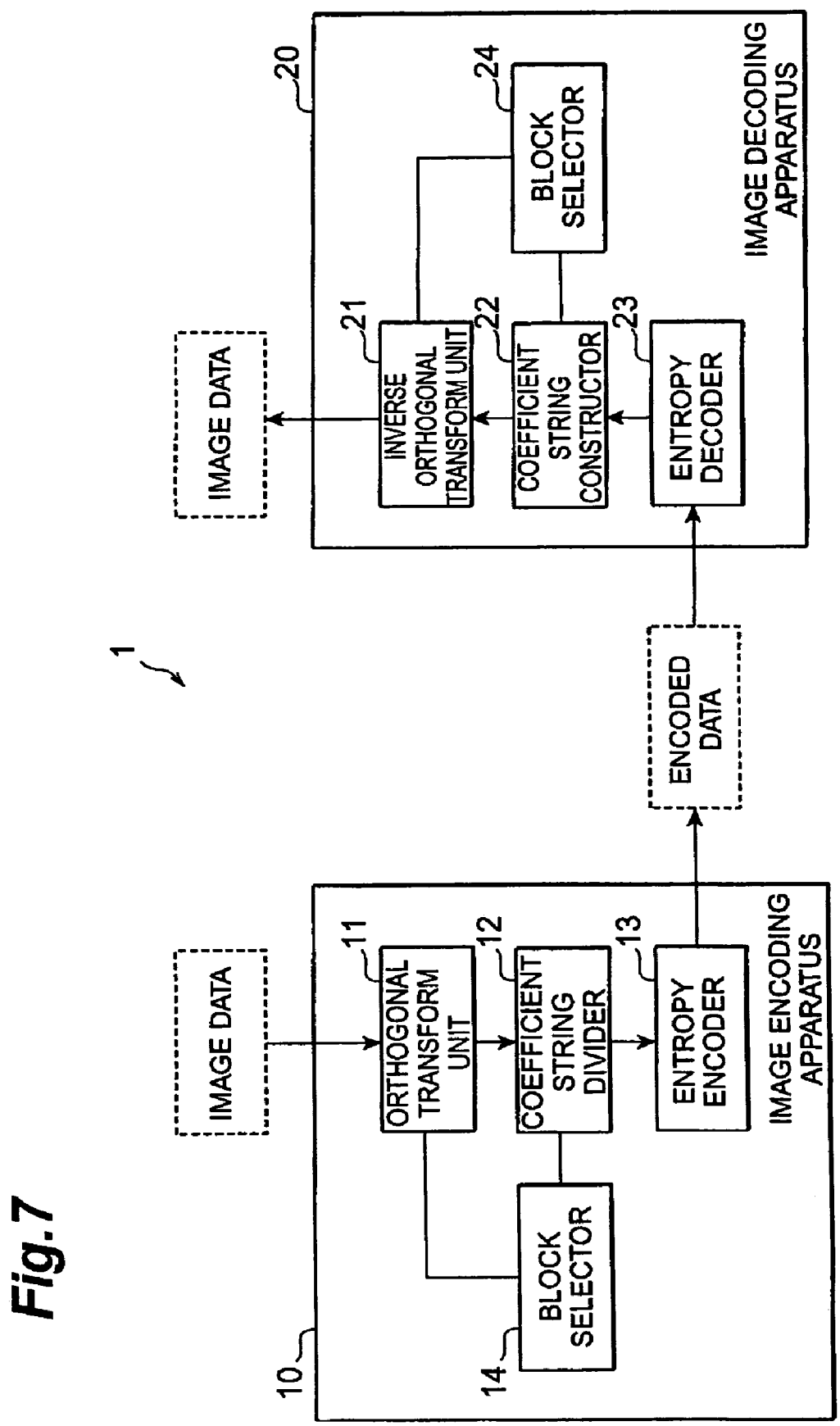

IMAGE ENCODING METHOD, IMAGE DECODING METHOD, IMAGE ENCODING APPARATUS, IMAGE DECODING APPARATUS, IMAGE ENCODING PROGRAM, AND IMAGE DECODING PROGRAM

This application claims priority under 35 U.S.C 119 to a Japanese patent application No 2002-295429 filed on Oct. 8, 2002. The entire contents of the application 2002-295429 are hereby incorporated by reference.

BACKGROUND OF THE INVENTION

1. Field of the Invention

The present invention relates to an image encoding method, an image decoding method, an image encoding apparatus, an image decoding apparatus, an image processing system, an image encoding program, and an image decoding program capable of implementing efficient entropy coding of orthogonal transform coefficients in an orthogonal transform permitting selection among multiple block sizes.

2. Related Background Art

Encoding techniques of image signals are used for transmission and for accumulation and reproduction of image signals of still images, moving images, and so on. Such techniques include known international standard encoding methods, e.g., ISO/IEC International Standard 10918 (hereinafter referred to as JPEG) as an encoding technique for still images, and ISO/IEC international Standard 14496-2 (MPEG-4 Visual, which will be referred to as hereinafter as MPEG-4) as an encoding technique for moving images. A newer known encoding method is ITU-T Recommendation H.264; ISO/IEC International Standard 14496-10 (Joint Final Committee Draft of Joint Video Specification, ftp//ftp.imtc-files.org/jvt-experts/2002 07 Klagenfurt/JVT-D157.zip, which will be referred to hereinafter as H.26L), which is a video coding method intended for joint international standardization by ITU-T and ISO/IEC.

Image signals demonstrate close correlations between spatially neighboring pixels and thus transformation into the frequency domain leads to deviation of information to the low frequency region, which enables reduction of redundancy by making use of the deviation. Therefore, the typical image encoding methods adopt a technique of subjecting image signals to an orthogonal transform to transform them into orthogonal transform coefficients in the frequency domain, so as to achieve deviation of signal components to the low frequency region. Furthermore, the coefficient values are quantized so that small-valued coefficients are converted into zeros. A coefficient string is made by reading the coefficients in order from the lowest in the low frequency region and is subjected to entropy coding taking advantage of the deviation of coefficient values, thus achieving efficient encoding with reduction of redundancy.

In this case, the Discrete Cosine Transform (DCT) is commonly used as the orthogonal transform in terms of encoding efficiency and ease of implementation. The orthogonal transform such as the DCT is carried out in units of blocks resulting from division of image signals into blocks each consisting of a plurality of pixels. The size of the blocks, as well as the property of the image signals, largely affects the encoding efficiency.

When image signals demonstrate only small change in the spatial property, image signals to be transformed into orthogonal transform coefficients in a narrow frequency region are widely distributed on an image, and the redundancy can be reduced more with increase in the size of the blocks, i.e., the size of the orthogonal transform, so as to increase the encoding efficiency, as compared with cases using smaller blocks, which raise the need for repeatedly expressing identical orthogonal transform coefficients. When image signals demonstrate large change in the spatial property on the other hand, the increase in the size of blocks results in obtaining various frequency components of orthogonal transform coefficients thereof and thus decreasing the deviation of coefficients, which makes efficient entropy coding difficult and thus decreases the encoding efficiency.

In order to take advantage of the change of encoding efficiency due to the changes in the sizes of the blocks for the orthogonal transform and the property of image signals, the technology utilized is one of preparing orthogonal transform means in a plurality of block sizes in advance and adaptively selecting and using a size achieving the best encoding efficiency out of them. This technology is called Adaptive Block size Transforms (ABT) and is adopted in H.26L. FIG. 1A-FIG. 1E show orthogonal transform blocks used for the ABT in H.26L. The ABT permits a size achieving the best encoding efficiency to be selected out of four types of orthogonal transform block sizes shown in FIGS. 1B-1E, for each macroblock of 16×16 pixels shown in FIG. 1A. Pixel values of each macroblock are equally divided in units of blocks of the selected size and are then subjected to the orthogonal transform. By implementing such selection, it becomes feasible to achieve efficient reduction of redundancy through the use of the orthogonal transform in accordance with the change in the spatial property of image signals in the macroblocks. Reference should be made to H.26L as to more specific details of the ABT.

The entropy coding for the orthogonal transform coefficients obtained by the orthogonal transform is effected on a coefficient string obtained by sequentially reading the orthogonal transform coefficients from the lowest in the low frequency region. FIG. 2A shows an order of reading coefficients in an orthogonal transform block of 4×4 pixels. Since the coefficients obtained by the orthogonal transform are arranged with the lowest frequency component (i.e., the dc component) at the left upper corner, the coefficients are read out in order from the left upper coefficient to obtain a coefficient string consisting of sixteen coefficients as shown in FIG. 2B. This reading order is called zig-zag scan.

The coefficients obtained by the orthogonal transform are noncorrelated with each other, and the signal components deviate to the low frequency region. For this reason, when they are further quantized, the lower frequency coefficients are more likely to be nonzero coefficient values, so that many zero-valued coefficients appear in the coefficient string. For example, it produces a sequence of coefficient values as shown in FIG. 2C. Therefore, for efficient entropy coding of the coefficient string of this distribution, it is common practice in encoding of images to perform the encoding by expressing the coefficient string by the numbers of continuous zero coefficients preceding a nonzero coefficient (runs) and coefficient values (levels) of the nonzero coefficients. Such encoding with runs and levels is also used in the entropy coding of orthogonal transform coefficients by the ABT.

On the other hand, in order to increase the efficiency more in the entropy coding as described above, H.26L employs the technology called Context-based Adaptive Variable Length Code (CAVLC), which is applied to the orthogonal transform without the use of the ABT, i.e., to cases where the orthogonal transform is always carried out in units of orthogonal transform blocks of 4×4 pixels.

The CAVLC in H.26L utilizes the following features: the maximum number of coefficients in the coefficient string obtained from each orthogonal transform block of 4×4 pixels is 16, the magnitude of runs is restricted by this maximum number, and the magnitude of levels tends to be larger at lower frequencies. A number of encoding tables used in variable length encoding are prepared as optimized tables for respective conditions, and they are applied while sequentially being switched, so as to increase the encoding efficiency.

For example, in the case where runs are encoded in order, the first run can take a variety of values from 0 to 14 (according to the definition of runs in H.26L, the maximum value of runs is 14, which is two smaller than the total number of coefficients). On the other hand, a run appearing in the last stage of the sequential encoding of runs can take only one of limited run values, because there is the upper limit to the number of coefficients in the coefficient string. Accordingly, as shown in FIG. 3, the right-side encoding table with the largest number of elements in the encoding table is applied to runs appearing in the initial stage, and the left-side encoding tables with the smaller number of elements in each encoding table are applied to runs appearing in the last stage. This permits assignment of codes of smaller bit counts and thus implements efficient entropy coding. The CAVLC achieves the efficient encoding by making use of the conditions such as the maximum number of coefficients in each block and placing restrictions on the range where values to be encoded can take. Reference should be made to H.26L as to more specific details of the CAVLC.

SUMMARY OF THE INVENTION

By applying the foregoing CAVLC to the ABT, it can be expected that more efficient entropy coding will also be achieved with the coefficient strings of the ABT.

However, the CAVLC achieves the increase of encoding efficiency by optimizing the encoding tables in variable length coding for the respective conditions, based on the maximum number of coefficients in blocks, and applying the encoding tables to the encoding with switching among them.

In use of the ABT, the number of coefficients in each block differs depending upon blocks of different sizes; 64 in the case of 8×8 blocks in FIG. 1B, 32 in the cases of 8×4 and 4×8 blocks in FIGS. 1C and 1D, and 16 in the case of 4×4 blocks in FIG. 1E. For this reason, the application of the CAVLC requires consideration to the huge number of conditions that can occur in the respective cases.

For example, supposing the encoding tables are set according to the maximum number of coefficients in coefficient strings, like the encoding tables of runs shown in FIG. 3, the huge number of encoding tables must be prepared; in the case of 8×8 blocks with the number of coefficients being 64, it is necessary to prepare the encoding tables ranging from the encoding table of the number of elements being 2 to the encoding table of the number of elements being 62. Likewise, in the cases of 8×4 and 4×8 blocks with the number of coefficients being 32, the encoding tables must be prepared from that of the number of elements being 2 to that of the number of elements being 30.

When the entropy coding adapted to the characteristics of coefficients like the CAVLC was attempted to be applied to the orthogonal transforms selectively using the orthogonal transform blocks of different sizes like the ABT as described above, there was the problem that the number of encoding tables to be prepared became huge and the memory capacity necessary for retention of the encoding tables became so large. Since it also involved the use of the different encoding tables for blocks of respective sizes and the different selection procedures thereof, there was the problem that the procedure in the entropy coding became complicated and thus implementing means and instrumental structure became complicated.

The present invention has been accomplished in order to solve the above problems, and an object of the invention is to provide an image encoding method, an image decoding method, an image encoding apparatus, an image decoding apparatus, an image processing system, an image encoding program, and an image decoding program enabling efficient entropy coding in the orthogonal transform of variable sizes.

In order to achieve the above object, an image encoding method (apparatus) according to the present invention is an image encoding method (apparatus) of dividing image signals into blocks, performing an orthogonal transform of each block, reading resultant orthogonal transform coefficients to obtain a coefficient string, and performing entropy coding thereof, the image encoding method (apparatus) comprising: a block selecting step (means) of selecting a size of a block for the orthogonal transform, out of a plurality of blocks of different sizes; a coefficient string dividing step (means) of, when a block of a size larger than a minimum size is selected in the block selecting step (means), dividing a coefficient string in the block into a plurality of coefficient strings of a length equal to that of a coefficient string in a block of the minimum size; and an encoding step (means) of performing entropy coding adapted to the coefficient string in the block of the minimum size. An image encoding program according to the present invention is configured to let a computer execute each of the above steps.

In the image encoding method according to the present invention, as described above, when a block of a large size is selected to be subjected to the orthogonal transform, the coefficient string in that block is first divided into coefficient strings and then the entropy coding is carried out for each of them. This permits the entropy coding adapted to the coefficient string in the block of the minimum size to be applied to the entropy coding of the coefficient string in the selected block, whereby it is feasible to implement efficient entropy coding of orthogonal transform coefficients, without complicating the procedure of entropy coding.

In the above image encoding method (apparatus), the coefficient string dividing step (means) may be configured to read coefficients of the coefficient string from the lowest in a low frequency region and assign the read coefficients one by one in order to the plurality of coefficient strings of the length equal to that of the coefficient string in the block of the minimum size, thereby obtaining the divided coefficient strings. In the above image encoding program, the coefficient string dividing step executed by the computer may also be configured to read coefficients of the coefficient string from the lowest in a low frequency region and assign the read coefficients one by one in order to the plurality of coefficient strings of the length equal to that of the coefficient string in the block of the minimum size, thereby obtaining the divided coefficient strings.

In the above image encoding method (apparatus), the coefficient string dividing step (means) may be configured to read coefficients of the coefficient string from the lowest in a low frequency region and repeatedly perform reading of coefficients by the number equal to the number of coefficients in the coefficient string in the block of the minimum size to obtain a divided coefficient string, thereby obtaining the divided coefficient strings. In the above image encoding program, the coefficient string dividing step executed by the computer may also be configured to read coefficients of the coefficient string from the lowest in a low frequency region and repeatedly perform reading of coefficients by the number equal to the number of coefficients in the coefficient string in the block of the minimum size to obtain a divided coefficient string, thereby obtaining the divided coefficient strings.

An image decoding method (apparatus) according to the present invention is an image decoding method (apparatus) of decoding encoded data encoded by an image encoding method of dividing image signals into blocks, performing an orthogonal transform of each block, reading resultant orthogonal transform coefficients to obtain a coefficient string, and performing entropy coding thereof, the image decoding method (apparatus) comprising: a block selecting step (means) of selecting a size of a block for the orthogonal transform, out of a plurality of blocks of different sizes; a decoding step (means) for performing decoding of the encoded data by entropy coding adapted to a coefficient string in a block of a minimum-size out of the plurality of blocks; and a coefficient string constructing step (means) of, when a block of a size larger than the minimum size is selected in the block selecting step (means), constructing a coefficient string of the block of the larger size from a plurality of coefficient strings decoded in the decoding step (means). An image decoding program according to the present invention is configured to let a computer execute each of the above steps.

In the image decoding method according to the present invention, as described above, when a block of a larger size is selected to implement decoding of the encoded data subjected to the orthogonal transform, the coefficient string in that block is constructed from coefficient strings of blocks included in that block. This permits a coefficient string to be decoded from the encoded data by the entropy coding adapted to the coefficient string in the block of the minimum size, whereby it is feasible to implement efficient entropy coding of orthogonal transform coefficients, without complicating the procedure of decoding of entropy coding.

In the above image decoding method (apparatus), the coefficient string constructing step (means) may be configured to read coefficients in the plurality of coefficient strings decoded in the decoding step (means), from the lowest in a low frequency region and write the coefficients read out of the respective coefficient strings, one by one in order into a new coefficient string from the low frequency region, thereby obtaining the constructed coefficient string. In the above decoding program, the coefficient string constructing step executed by the computer may also be configured to read coefficients in the plurality of coefficient strings decoded in the decoding step, from the lowest in a low frequency region and write the coefficients read out of the respective coefficient strings, one by one in order into a new coefficient string from the low frequency region, thereby obtaining the constructed coefficient string.

In the above image decoding method (apparatus), the coefficient string constructing step (means) may be configured to read coefficients in the plurality of coefficient strings decoded in the decoding step (means), from the lowest in a low frequency region and write the read coefficients in units of the original coefficient strings into a new coefficient string from the low frequency region, thereby obtaining the constructed coefficient string. In the above image decoding program, the coefficient string constructing step executed by the computer may also be configured to read coefficients in the plurality of coefficient strings decoded in the decoding step, from the lowest in a low frequency region and write the read coefficients in units of the original coefficient strings into a new coefficient string from the low frequency region, thereby obtaining the constructed coefficient string.

An image processing system according to the present invention comprises the above image encoding apparatus and the above image decoding apparatus.

The image processing system enables efficient entropy coding in the orthogonal transform of variable sizes because of the provision of the above image encoding apparatus and also enables decoding of codes entropy-encoded by the above image encoding apparatus, because of the provision of the above image decoding apparatus.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 1A to FIG. 1E are diagrams showing the orthogonal transform blocks used in the Adaptive Block size Transforms (ABT) of H.26L.

FIG. 3 is a diagram showing the encoding tables of runs used in the Context-based Adaptive Variable Length Code (CAVLC) of H.26L.

FIG. 4A to FIG. 4D are diagrams showing an example in which a method of readout and division of orthogonal transform coefficients according to the present invention is carried out for an 8×8 block.

FIG. 6A to FIG. 6D are diagrams showing an example in which another method of readout and division of orthogonal transform coefficients according to the present invention is carried out for an 8×8 block.

FIG. 7 is a block diagram showing a configuration of an image processing system according to an embodiment.

DESCRIPTION OF THE PREFERRED EMBODIMENTS

Figures 2A, 2B, 2C:
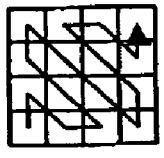
FIG. 2A to FIG. 2C are diagrams showing a readout method of reading coefficients in a 4×4 block, and an example of a coefficient string after readout.

The preferred embodiments of the image encoding method, image decoding method, image encoding apparatus, image decoding apparatus, and image processing system according to the present invention will be described below in detail with reference to the drawings. The same elements will be denoted by the same reference symbols throughout the description of the drawings, without redundant description thereof.

The description will be based on the premise that the encoding and decoding in the description hereinafter are implemented on the basis of H.26L, and the part without specific description about the operation in the image encoding is supposed to conform to the operation in H.26L. It is, however, noted that the present invention is not limited to H.26L.

An embodiment of the present invention will be described. In the encoding according to the present embodiment, concerning the orthogonal transform coefficients in blocks of the respective sizes in the ABT of H.26L, a coefficient string obtained from each block is divided into a plurality of coefficient strings each consisting of coefficients in the number equal to the number of coefficients in a coefficient string of a 4×4 block. This makes it feasible to perform the entropy coding by the CAVLC of H.26L defined so as to be adapted to the 4×4 blocks.

It is assumed that in the encoding, first, the ABT in H.26L is applied to one macroblock, a size achieving the best encoding efficiency is selected out of the blocks shown in FIGS. 1B-1E, and the orthogonal transform is effected in units of the blocks of the selected size.

It is also assumed that the CAVLC in H.26L is employed as the entropy coding of orthogonal transform coefficients. Namely, it is assumed that only the variable length encoding adapted to the encoding of orthogonal transform coefficients for the 4×4 block shown in FIG. 1E is defined.

For example, let us suppose herein that the 8×8 block in FIG. 1B is selected. The following readout operation of reading the orthogonal transform coefficients is carried out for this 8×8 block. First, sixty four coefficients in the 8×8 block are read out by zig-zag scan as shown in FIG. 4A, to obtain a coefficient string as shown in FIG. 4B.

Then this coefficient string is divided into four coefficient strings each consisting of sixteen coefficients, the number of which is the same as the number of coefficients in the coefficient string of the 4×4 block. Here the coefficients in the original coefficient string are read out from the lowest in the low frequency region and alternately assigned to the four coefficient strings, thereby obtaining the coefficient strings after division. FIG. 4C and FIG. 4D show this readout operation. Since the coefficients are alternately assigned to the respective coefficient strings from the lowest in the low frequency region, the first divided coefficient string is assigned the coefficients read out in the order of the zeroth, fourth, eighth, twelfth, . . . in the original coefficient string, and the second divided coefficient string is assigned the coefficients read out in the order of the first, fifth, ninth, thirteenth, . . . in the original coefficient string. The third and fourth divided coefficient strings are not illustrated in FIGS. 4A-4D.

Similarly, when the 8×4 block or 4×8 block of FIG. 1C or FIG. 1D is selected, thirty two coefficients are divided into two coefficient strings each consisting of sixteen coefficients. The readout method for obtaining the divided coefficient strings is also similar to that in the case of the 8×8 block except that the number of coefficient strings alternately assigned the coefficients is 2, instead of 4; the coefficients in the original coefficient string are read out from the lowest in the low frequency region and alternately assigned to the two coefficient strings.

The coefficient strings obtained in this way are entropy encoded according to the same procedure as the encoding of CAVLC without the use of the ABT, and the encoded data is outputted in order as encoded data of orthogonal transform coefficients in the ABT block.

Figure 5A:
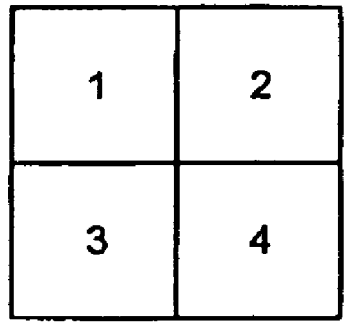
FIG. 5A to FIG. 5C are diagrams showing definitions of arrangement in original blocks, of coefficient strings after division according to the present invention.

At this time, the CAVLC of H.26L utilizes the space context to switch the applied encoding table on the basis of the number of nonzero coefficients in an adjacent 4×4 block. For this reason, arrangements of coefficient strings after division in the ABT blocks are defined for the ABT blocks larger than the 4×4 block. The definitions are presented in FIG. 5A to FIG. 5C. For example, the 8×8 block shown in FIG. 5A is handled on the assumption that the first divided coefficient string illustrated in FIG. 4C is located at the position of "1" and the second divided coefficient string illustrated in FIG. 4D at the position of "2." It is assumed that, using the definitions of the arrangement, the space context for the divided coefficient strings in the ABT blocks, or the space context for 4×4 blocks adjacent to the ABT blocks is handled in the same manner without any change as in the technique in the CAVLC of H.26L.

In the decoding, the original orthogonal transform matrix can be obtained according to the procedure reverse to the procedure in the encoding.

Let us suppose that the ABT in H.26L is applied to one macroblock, a size is designated out of the blocks shown in FIGS. 1B to 1E, and encoded data from this macroblock is one resulting from the orthogonal transform carried out in units of ABT blocks of the size.

At this time the encoded data contains encoded data obtained by entropy coding of the divided coefficient strings by the CAVLC, in order as encoded data of orthogonal transform coefficients in the ABT blocks. Accordingly, it is sequentially decoded according to the procedure of CAVLC to obtain the coefficient strings after the division.

Since these divided coefficient strings are coefficient strings divided by the readout method shown in FIGS. 4A-4D, the original orthogonal transform coefficient block can be obtained by conversely writing the coefficients of the divided coefficient strings into each original coefficient string and further writing the resultant coefficient strings into the orthogonal transform coefficient block. The procedure thereafter is the same as the decoding procedure with application of the ABT in H.26L.

A configuration of image processing system 1 for implementing the above image encoding and image decoding will be described below. FIG. 7 is a block diagram showing image processing system 1 according to an embodiment. The image processing system 1 is composed of image encoding apparatus 10 for encoding image data, and image decoding apparatus 20.

The image encoding apparatus 10 has orthogonal transform unit 11, coefficient string divider 12, entropy encoder 13, and block selector 14. The orthogonal transform unit 11 has a function of performing the orthogonal transform of image data to transform it into frequency components. The orthogonal transform unit 11 divides each macroblock of the image data into a plurality of blocks and performs the orthogonal transform of the divided blocks. It is connected to block selector 14, and the block selector 14 selects a block capable of implementing the orthogonal transform with the best efficiency.

The coefficient string divider 12 has a function of dividing a coefficient string obtained by the orthogonal transform, into coefficient strings of a predetermined length. Here the term "predetermined length" is defined as a length of a coefficient string obtained by the orthogonal transform of a block of a minimum size out of the blocks into which a macroblock can be divided for the orthogonal transform of image data by orthogonal transform unit 11.

The entropy encoder 13 has a function of encoding the coefficient strings divided by the coefficient string divider 12. Since the coefficient string divider 12 divides the original coefficient string into the coefficient strings of the same length as that of the coefficient string of the minimum block as described above, the entropy encoder 13 can be configured to be adapted for encoding of the coefficient strings of that length and can perform efficient encoding.

The image decoding apparatus 20 has entropy decoder 23, coefficient string constructor 22, inverse orthogonal transform unit 21, and block selector 24. The entropy decoder 23 has a function of decoding encoded data.

The coefficient string constructor 22 has a function of constructing an original coefficient string from coefficient strings divided upon encoding by image encoding apparatus 10. The coefficient string constructor 22 is connected to block selector 24, acquires information about the size of the original block from the block selector 24, and constructs the original coefficient string on the basis of the information. The block selector 24 is able to acquire the size of the original block, based on additional information or the like transmitted with the encoded data from the image encoding apparatus.

The inverse orthogonal transform unit 21 has a function of transforming the coefficient strings constructed by the coefficient string constructor 22, into image data.

The image processing system 1 of the structure as described above implements the aforementioned image encoding and image decoding. The aforementioned image encoding method and image decoding method can be substantialized by an image encoding program and an image decoding program for letting a computer execute each of the steps thereof.

In the present embodiment the zig-zag scan was applied to readout of orthogonal transform coefficients, but the readout method of coefficients in application of the present invention does not have to be limited to the zig-zag scan. For example, the present invention may also be applied to cases of application of the field scan for field encoding in interlaced images, which is defined in the ABT of H.26L. In this application, the dividing technique of the coefficient strings in the present embodiment can also be applied as it is.

The present embodiment showed the alternate readout method as shown in FIGS. 4A-4D, as a readout method for obtaining the coefficient strings after the division, but it is also possible to obtain the coefficient strings after the division by another readout method different therefrom. For example, as shown in FIGS. 6C and 6D, sixteen consecutive coefficients each are read out from the original coefficient string from the lowest in the low frequency region and each series is assigned to one of the coefficient strings after the division.

In the present embodiment, the readout of orthogonal transform coefficients in the encoding is implemented so as to first perform the first readout for obtaining the coefficient string from the orthogonal transform block and then perform the second readout for obtaining a plurality of coefficient strings after the division. The writing of orthogonal transform coefficients in the decoding is implemented so as to first perform the first writing for obtaining the coefficient string after construction and then perform the second writing for obtaining the orthogonal transform block. However, the readout and writing of coefficients according to the present invention do not have to be limited to these methods, but may also be implemented by a variety of readout and writing methods that can obtain coefficient strings in the desired arrangement. For example, it is also possible to implement such readout as to immediately obtain a plurality of divided coefficient strings in the first coefficient readout from the orthogonal transform block. The writing from the divided coefficient strings may also be modified so as to immediately obtain the orthogonal transform block in the first coefficient writing.

Figure 5B:
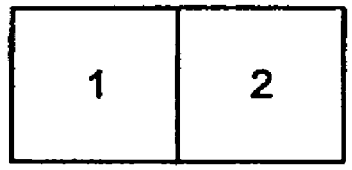
Figure 5C:
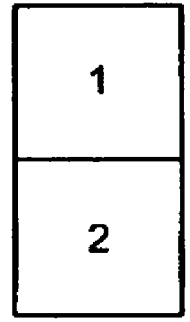

In the present embodiment, the coefficient strings after the division were arranged as shown in FIGS. 5A-5C, and the space context from the adjacent 4×4 block in the CAVLC in H.26L was assumed to be handled without any change. In this regard, it can also be contemplated that the coefficient strings divided from the coefficient strings of the ABT blocks larger than the 4×4 block are originally different in the property from the coefficient strings in the case of the 4×4 block and weights are given to numerals used as the space context. Specifically, where the number of nonzero coefficients is used as the space context from the adjacent block, a constant is always added to or multiplied by the number of nonzero coefficients in each divided coefficient string obtained from an ABT block larger than the 4×4 block, when used as the space context. In another configuration, where the coefficient strings after the division are obtained by continuously reading out the coefficients from the lowest in the low frequency region as shown in FIGS. 6A-6D, different constants may be added to or multiplied by coefficients read out from the low frequency region and coefficients read out from the high frequency region.

The embodiments were described on the premise that the encoding and decoding were substantialized on the basis of H.26L and were described based on the ABT and CAVLC in H.26L. However, it is noted that the image encoding methods to which the present invention can be applied are not limited to H.26L, and the present invention can be applied to various image encoding methods permitting selection among a plurality of sizes of blocks for the orthogonal transform and using the entropy coding adapted to the orthogonal transform coefficients.

The image encoding method, image decoding method, image encoding apparatus, image decoding apparatus, and image processing system according to the present invention provide the following effect, as detailed above. Namely, where a size of a block for the orthogonal transform can be selected from a plurality of sizes, a coefficient string consisting of resultant orthogonal transform coefficients is divided into a plurality of coefficient strings of the same size as that of the coefficient string in the block of the minimum size and each of these coefficient strings is subjected to the entropy coding adapted to the coefficient string in the block of the minimum size; whereby it is feasible to implement the efficient entropy coding, without increase in the number of encoding tables in the entropy coding and without complicating the encoding tables and the procedure of selection thereof.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An image decoding method for decoding coded picture data which is derived from:
dividing a matrix of image signal into blocks of different sizes;
performing an orthogonal transform on the respective blocks;
reading resultant orthogonal transform coefficients into strings of transform coefficients while arranging a single string of transform coefficients from a block larger than a block of a minimum size into shorter strings of transform coefficients each having a length equal to that of a string of transform coefficients from the minimum size block; and
entropy-coding the respective strings of transform coefficients, the image decoding method comprising:
entropy-decoding the coded picture data to derive the strings of entropy-decoded transform coefficients;
combining the shorter strings of entropy-decoded transform coefficients back into the single string of entropy-decoded transform coefficients; and
performing an inverse orthogonal transform on the single string of entropy-decoded transform coefficients in order to reproduce the matrix of image signal;

wherein the coded picture data comprises entropy-coded data representing strings of sixteen (16) transform coefficients obtained by interleaving, from a lower frequency coefficient, sixty four (64) transform coefficients of an orthogonally transformed 8x8 block to produce four (4) strings of sixteen (16) transform coefficients, wherein entropy-decoding the coded picture data comprises entropy-decoding the entropy-coded data of the respective strings of sixteen (16) transform coefficients, wherein combining the shorter strings of entropy-decoded transform coefficients comprises de-interleaving, from a lower frequency coefficient, sixty four (64) transform coefficients from the four (4) strings of sixteen (16) transform coefficients to reconstruct the single string consisting of the sixty four (64) transform coefficients of the orthogonally transformed 8x8 block, and wherein performing an inverse orthogonal transform comprises performing an inverse orthogonal transform on the sixty four (64) transform coefficients of the orthogonally transformed 8x8 block.

2. An image decoding apparatus for decoding coded picture data which is derived from:

dividing a matrix of image signal into blocks of different sizes;

performing an orthogonal transform on the respective blocks;

reading resultant orthogonal transform coefficients into strings of transform coefficients while arranging a single string of transform coefficients from a block larger than a block of a minimum size into shorter strings of transform coefficients each having a length equal to that of a string of transform coefficients from the minimum size block; and entropy-coding the respective strings of transform coefficients, the image decoding apparatus comprising:

an entropy decoder configured to entropy-decode the coded picture data to derive the strings of entropy-decoded transform coefficients;

a string reconstructor configured to combine the shorter strings of entropy-decoded transform coefficients back into the single string of entropy-decoded transform coefficients; and an inverse orthogonal transformer configured to perform an inverse orthogonal transform on the single string of entropy-decoded transform coefficients in order to reproduce the string of image signal;

wherein the coded picture data comprises entropy-coded data representing strings of sixteen (16) transform coefficients obtained by interleaving, from a lower frequency coefficient, sixty four (64) transform coefficients of an orthogonally transformed 8x8 block to produce four (4) strings of sixteen (16) transform coefficients, wherein the entropy decoder entropy-decodes the entropy coded data of the respective strings of sixteen (16) transform coefficients, wherein the string reconstructor de-interleaves, from a lower frequency coefficient, sixty four (64) transform coefficients from the four (4) strings of sixteen (16) transform coefficients to reconstruct the single string consisting of the sixty four (64) transform coefficients of the orthogonally transformed 8x8 block, and wherein the inverse orthogonal transformer performs an inverse orthogonal transform on the sixty four (64) transform coefficients of the orthogonally transformed 8x8 block.

3. A non-transitory storage medium which stores an image decoding program executable on a computer which causes the computer to decoding coded picture data which is derived from:

dividing a matrix of image signal into blocks of different sizes;

performing an orthogonal transform on the respective blocks;

reading resultant orthogonal transform coefficients into strings of transform coefficients while arranging a single string of transform coefficients from a block larger than a block of a minimum size into shorter strings of transform coefficients each having a length equal to that of a string of transform coefficients from the minimum size block; and entropy coding the respective strings of transform coefficients, the program further causing the computer to:

entropy decoding the coded picture data to derive the strings of entropy decoded transform coefficients;

combining the shorter strings of transform coefficients back into the single string of transform coefficients; and performing an inverse orthogonal transform on the single string of entropy decoded transform coefficients in order to reproduce the string of image signal;

wherein the coded picture data comprises entropy coded data representing strings of sixteen (16) transform coefficients obtained by interleaving, from a lower frequency coefficient, sixty four (64) transform coefficients of an orthogonally transformed 8x8 block to produce four (4) strings of sixteen (16) transform coefficients, wherein entropy decoding the coded picture data comprises entropy decoding the entropy coded data of the respective strings of sixteen (16) transform coefficients, wherein combining the shorter strings of entropy decoded transform coefficients comprises de-interleaving, from a lower frequency coefficient, sixty four transform coefficients from the four (4) strings of sixteen (16) transform coefficients to reconstruct the single string consisting of the sixty four (64) transform coefficients of the orthogonally transformed 8x8 block, and wherein performing an inverse orthogonal transform comprises performing an inverse orthogonal transform on the sixty four (64) transform coefficients of the orthogonally transformed 8x8 block.

4. An image decoding method for decoding coded picture data, comprising:

computer-executable steps performed by a processor of a computer system to implement:

entropy-decoding the coded picture data to derive four transform coefficient strings each comprising entropy-decoded sixteen (16) transform coefficients;

combining the four strings into an 8x8 block of entropy-decoded sixty four (64) transform coefficients by de-interleaving the four strings in such a manner as to select a lower frequency transform coefficient alternately from the four strings and arrange it in the 8x8 block in an order of a low frequency to a high frequency; and performing an inverse orthogonal transform on the 8x8 block of the entropy-decoded sixty four (64) transform coefficients.

5. An image decoding apparatus for decoding coded picture, comprising:
a processor of a computer system and a memory that stores programs executed by the processor to:
entropy-decode the coded picture data to derive four transform coefficient strings each comprising entropy-decoded sixteen (16) transform coefficients;
combine the four strings into an 8x8 block of entropy-decoded sixty four (64) transform coefficients by de-interleaving the four string in such a manner as to select a lower frequency transform coefficient alternately from the four strings arrange it in the 8x8 block in an order of a low frequency to a high frequency; and
perform an inverse orthogonal transform on the 8x8 block of the entropy-decoded sixty four (64) transform coefficients.

6. A non-transitory storage medium which stores image decoding programs executable on a processor of a computer system which causes the processor to implement:
entropy decoding the coded picture data to derive four transform coefficient strings each comprising entropy decoded sixteen (16) transform coefficients;
combining the four strings into an 8x8 block of entropy-decoded sixty four (64) transform coefficients by de-interleaving the four strings in such a manner as to select a lower frequency transform coefficient alternately from the four strings and arrange it in the 8x8 block in an order of a low frequency to a high frequency; and
performing an inverse orthogonal transform on the 8x8 block of the entropy decoded sixty four (64) transform coefficients.

* * * * *